United States Patent [19]

Kondziola et al.

[11] 4,420,127
[45] Dec. 13, 1983

[54] PAWL ACTUATOR FOR DUAL REEL RETRACTOR

[75] Inventors: Joseph D. Kondziola, Troy; Donald C. Sobieski, Sterling Heights, both of Mich.

[73] Assignee: General Motors Corporation, Detroit, Mich.

[21] Appl. No.: 299,406

[22] Filed: Sep. 4, 1981

[51] Int. Cl.³ .................. A62B 35/02; B65H 75/48
[52] U.S. Cl. ................................................ 242/107.4 A
[58] Field of Search ............... 242/107.4 A; 280/806, 280/802, 803; 297/478

[56] References Cited

U.S. PATENT DOCUMENTS

| | | | |
|---|---|---|---|
| 4,065,070 | 12/1977 | Pilarski et al. | 242/107.4 A |
| 4,094,475 | 6/1978 | Takada | 242/107.4 A |
| 4,135,683 | 1/1979 | Stephenson et al. | 242/107.4 A |
| 4,164,336 | 8/1979 | Higbee et al. | 242/107.4 A |
| 4,300,731 | 11/1981 | Kondziola | 242/107.4 A X |
| 4,344,589 | 8/1982 | Rumpf | 242/107.4 A |

Primary Examiner—John M. Jillions
Attorney, Agent, or Firm—Charles E. Leahy

[57] ABSTRACT

A single inertia sensing pendulum is employed to operate a transfer link which in turn provides sequential or simultaneous actuation of first and second pawls associated respectively with the ratchet plates carried by first and second reels. A mounting end of the transfer link is mounted by a trunnion arrangement which permits both pivotal movement about the mounting end and rolling movement about the longitudinal axis of the transfer link. An operating end of the transfer link has first and second abutment portions spaced each side of the longitudinal axis for respective engagement with the first and second pawls. The inertia sensing pendulum engages the transfer link intermediate the mounting end and the operating end and pivotally raises the transfer link in response to vehicle deceleration. The transfer link may roll simultaneous with pivoting movement to sequentially engage the first pawl with a tooth of the first reel ratchet plate while the second pawl is blocked by a tip-to-tip blocking alignment between the second reel ratchet plate and the second pawl. A subsequent slight unwinding rotation of the second reel then unblocks the second pawl to permit a counter rolling movement of the transfer link by the pendulum to engage the second pawl with the second reel ratchet plate. If the ratchet plates are rotating in phase with one another, the transfer link may pivot without rolling movement to simultaneously engage both locking pawls.

1 Claim, 6 Drawing Figures

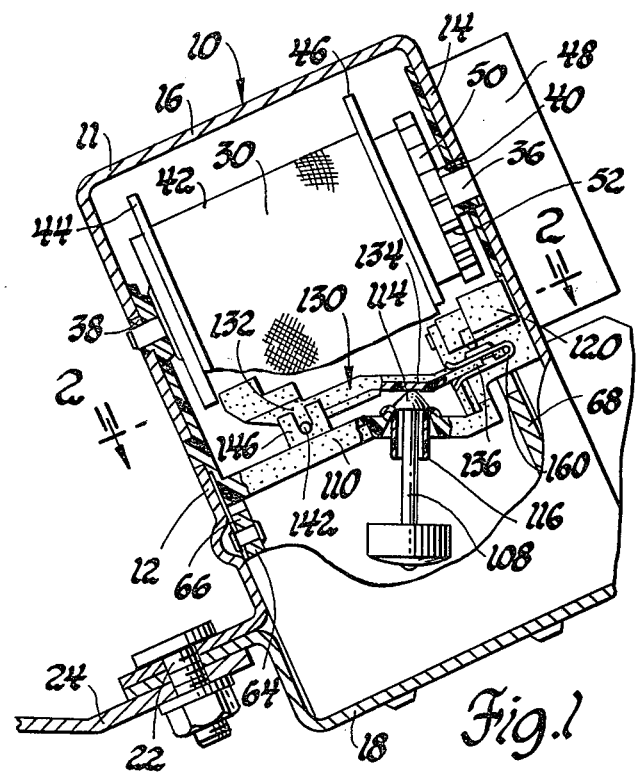
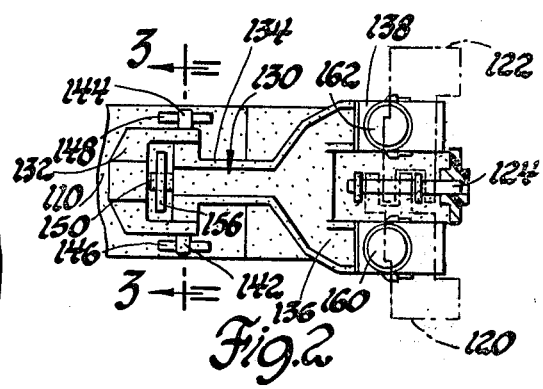
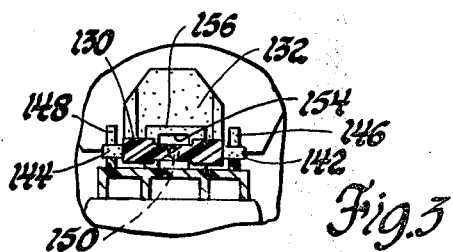
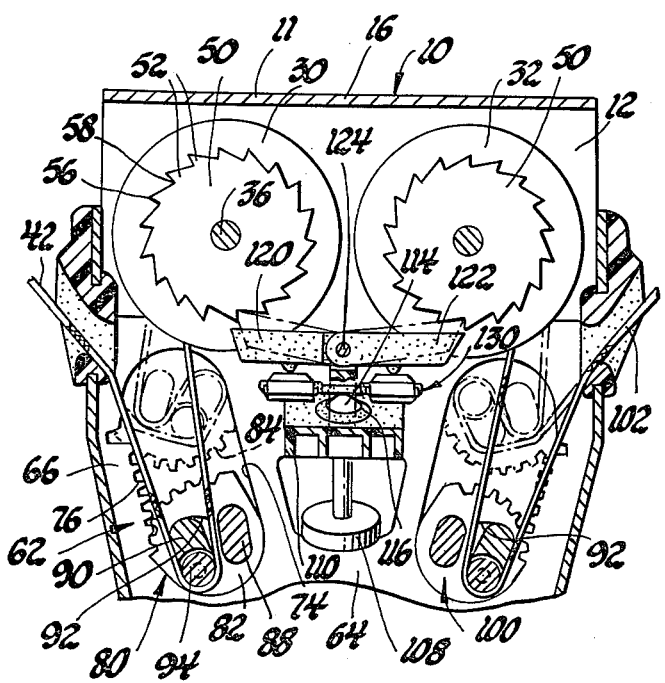
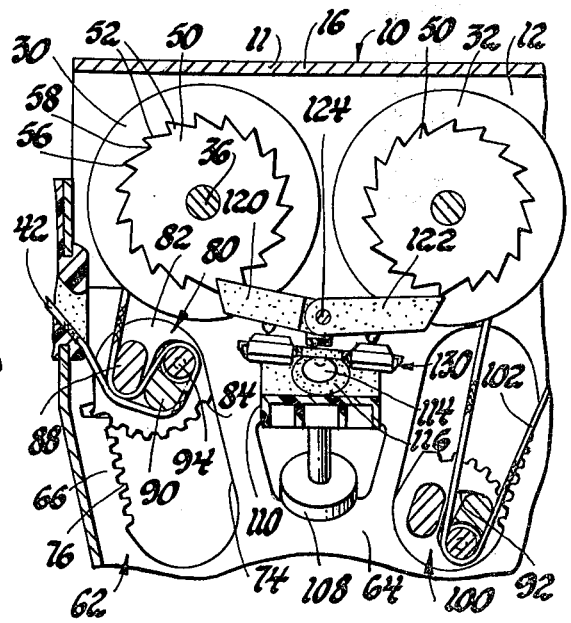
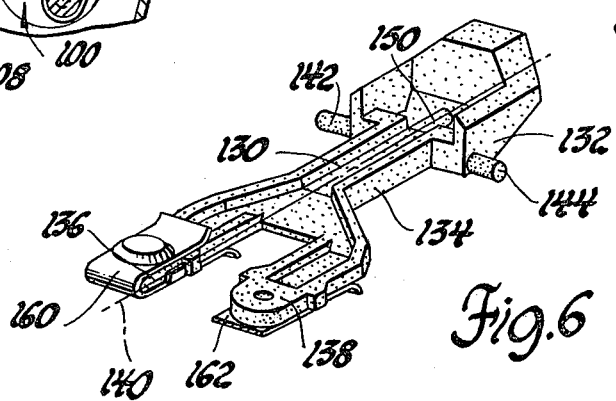

PAWL ACTUATOR FOR DUAL REEL RETRACTOR

The invention relates to a transfer link which is operated by an inertia sensing pendulum and mounted for pivoting and rolling movement to actuate either one or both of locking pawls associated with the two reels of a dual reel retractor.

BACKGROUND OF THE INVENTION

It is well known to provide a seat belt retractor having first and second belt reels which are mounted side-by-side within a retractor housing situated between the driver and passenger seats. Such a retractor is advantageously employed in passive restraint systems in which the ends of the belts wound by the first and second reels are attached respectively to the driver and passenger doors. Accordingly, movement of the doors between the open and closed positions will automatically move the belts between occupant restraining positions and occupant ingress and egress positions.

One such prior art dual reel retractor is disclosed in U.S. Pat. No. 4,300,731, issued Nov. 17, 1981 to Joseph D. Kondziola. In that retractor a separate pendulum is provided for actuating each of the locking pawls associated with the dual reels.

It would be desirable in dual reel retractors to have a single pendulum for actuating the locking pawls of both reels. One difficulty involved in having a single pendulum actuate the locking pawls associated with different reels is that the separate rotation of the reels may result in the ratchet teeth of the first reel being aligned with its locking pawl for proper locking engagement thereby while the ratchet teeth of the second reel may have a tip-to-tip alignment with the locking pawl so that the tip of the tooth blocks the pawl from obtaining its condition of locking engagement simultaneous with the locking engagement of the first reel.

SUMMARY OF THE INVENTION

According to the present invention, a single inertia sensing pendulum is employed to actuate a transfer link which in turn operates the first and second pawls associated respectively with first and second ratchet plates carried by first and second reels. The transfer link has a mounting end at one end of the longitudinal axis thereof for mounting the transfer link on the retractor frame. The mounting end of the transfer link is mounted on the frame by a trunnion arrangement which enables both pivotal movement of the transfer link about the mounting end and rolling movement about the longitudinal axis. An operating end is provided at the other end of the transfer link and includes first and second abutment portions spaced each side of the longitudinal axis for respective engagement with the first and second pawls. An inertia sensor is mounted on the frame and engages the transfer link intermediate the mounting end and the operating end and pivots the transfer link upwardly upon occurrence of a sensed vehicle deceleration condition. The transfer link may roll simultaneous with pivoting movement to sequentially engage the first pawl with a tooth of the first reel while the second pawl is blocked from engagement with a tooth of the second reel by a tip-to-tip blocking alignment between the second reel and the second pawl. A slight unwinding rotation of the second reel then unblocks the pawl to permit a counter rolling movement of the transfer link by the pendulum to engage the second pawl with a tooth of the second ratchet plate. Accordingly, the transfer link may be pivoted about its mounting end to simultaneously lock both reels or the transfer link may roll and then counter-roll simultaneous with pivoting movement to engage first one and then the other of the pawls with the ratchet teeth of the first and second reels.

Accordingly, the object, feature and advantage of the invention resides in the provision of a transfer link mounted for pivotal and rolling movement by an inertia sensor to sequentially or simultaneously engage first and second pawls with the first and second reels of a dual reel retractor.

BRIEF DESCRIPTION OF THE DRAWINGS

These and other objects, features and advantages of the invention will become apparent on consideration of the specification and the appended drawings in which:

FIG. 1 is a side elevation view of a dual reel retractor having a pendulum operated transfer link for actuating first and second locking pawls associated respectively with the first and second reels;

FIG. 2 is a sectional view taken in the direction of FIGS. 2—2 of FIG. 1 and showing a plan view of the transfer link and the locking pawls;

FIG. 3 is a sectional view taken in the direction of arrows 3—3 of FIG. 2 and showing the mounting of the transfer link on the pendulum support member;

FIG. 4 is an elevational view of the retractor of FIG. 1 showing the side-by-side location of the dual reels and showing the pawls in the unlocked position;

FIG. 5 is a view similar to FIG. 4 but showing the actuation of the transfer link by the pendulum to raise the lock bars into engagement with the first and second reels;

FIG. 6 is a perspective view of the transfer link.

DESCRIPTION OF THE PREFERRED EMBODIMENT

Referring to FIGS. 1 and 4 there is shown a dual reel seat belt retractor 10 according to the invention. The retractor is particularly suited for use in a passive seat belt system where the retractor is mounted between the occupant seating position and the belts wound upon the dual reels are respectively mounted on the driver door and passenger door for automatic movement between restraining positions and occupant access positions upon door movement between open and closed positions.

THE HOUSING

The retractor 10 includes a stamped steel upper housing 11 including laterally spaced housing side walls 12 and 14 connected by an integral top wall 16. The retractor 10 also includes a lower housing 18. A bolt and nut assembly 22 extends through aligned apertures of mounting flanges on the upper housing 11 and the lower housing 18 to attach the retractor housing to a member 24 such as the vehicle seat or the vehicle floor between the seats.

THE DUAL REELS

As best seen in FIG. 4, a first reel 30 and a second reel 32 are mounted side-by-side on the retractor housing 11. Referring to FIG. 1, it is seen that the first reel 30 includes a reel shaft 36 having its ends journaled in the housing walls 12 and 14 by plastic bushings 38 and 40. A restraint belt 42 is attached to the reel shaft 36 between a pair of reel flanges 44 and 46. A spiral spring, not shown, is located within a spring housing 48 and urges winding of the reel 30 in the belt winding direction of rotation. A ratchet wheel 50 is carried by the reel shaft 36 and has a plurality of ratchet teeth 52. Each ratchet tooth 52 includes a tip 56 and a root 58. The second reel 32 is constructed identically to the first reel 30 and has like elements designated by like numerals.

THE BELT ROLL-UP AND CLAMPING MECHANISM

Referring again to FIG. 4, it is seen that the restraint belt 42 exits in the downwardly direction from the reel 30 and passes through a belt roll-up and clamping mechanism generally indicated at 62. The belt clamping and roll-up mechanism 62 is mounted within a frame 64 including spaced apart walls 66 and 68 which are juxtaposed respectively with the housing walls 12 and 14. The frame wall 66 has an elongated aperture 74, one side of which includes integral rack teeth 76 displayed therealong.

A belt spindle 80 includes a pinion gear 82 having teeth 84 which mesh with the rack teeth 76 of the frame wall 66. A similar pinion gear, not shown, meshes wth rack teeth provided in an elongated aperture of the frame wall 68. A bar 88 is fixedly attached to the pinion gears and extends therebetween. Another bar 90 has its ends seated within triangular shaped apertures 92 of the pinion gears so that the bar 90 pivots between a normal FIG. 4 position spaced away from the fixed bar 88 by more than one belt thickness and a position shown in the left-hand side of FIG. 5 in which the space between the bars 88 and 90 is reduced to less than one belt thickness. A rotatable roller 94 is carried by the bar 90. The restraint belt 42 exits downwardly from the belt reel 30 and passes between the fixed bar 88 and the pivoting bar 90. The roller 94 rotates during belt winding and unwinding to lessen the frictional drag on the belt 42.

A belt clamping and roller mechanism generally indicated at 100 is associated with the reel 32 and the belt 102 wound thereon. The roll-up and clamp mechanism 100 is constructed identically with the belt roll-up and clamping mechanism 62 and accordingly has like elements indicated by like numerals.

THE PAWL ACTUATOR

Referring again to FIG. 1, it is seen that an inertia sensing pendulum 108 is suspended from a molded plastic pendulum support member 110 which is attached to and extends between the housing walls 12 and 14. Pendulum 108 includes a pendulum head 114 which is pivotally seated within a gimbal sleeve 116 which depends through an aperture in the pendulum support member 110. The gimbal sleeve 116 mounts the pendulum 108 in a manner which permits a few degrees of tilting movement from the vertical position of FIG. 1 without causing an upward movement of the pendulum head 114 from the plane of the pendulum support. However, a rapid deceleration of the vehicle substantially tilts the pendulum 108 and in turn tilts the gimbal sleeve 116 so that the pendulum head 114 is raised above the pendulum support 110.

As best seen in FIGS. 1, 2 and 4, a pair of locking pawls 120 and 122 are pivotally mounted on a pivot shaft 124. The pawls 120 and 122 are moveable from a normal rest position of FIG. 4 spaced away from the ratchet wheels 50 to pivotally raised positions of FIG. 5 engaging with the ratchet teeth 52 of the ratchet wheels 50.

A transfer link, generally indicated at 130, couples the pendulum 108 with the locking pawls 120 and 122. The transfer link 130 is made of injection molded plastic and includes a mounting end 132 which is mounted on the pendulum support member 110 by a trunnion arrangement, central body position 134 which rests upon the pendulum head 114, and an operating end having abutment portions 136 and 138 which are spaced each side of the longitudinal axis 140 of the transfer link 130 for actuating the pawls 120 and 122.

The mounting end 132 of the transfer link 130 has a pair of trunnion pins 142 and 144 which project laterally outwardly and are received in upwardly opening mounting cradles 146 and 148 which are molded integrally with the pendulum support member 110. The engagement of the trunnion pins 142 and 144 within the mounting cradles 146 and 148 permit the transfer link to roll about the longitudinal axis 140 but restrain the transfer link against movement along the axis. The mounting end 132 also has a pin 150 which extends axially rearward from the mounting end and is captured within an opening 154 provided in a mounting tab 156 molded integral with the pendulum support member 110. The pin 150 is restrained against upward movement by the upper wall of the opening 154 so that the transfer link will pivot about the mounting end 132 when the pendulum head 114 is raised above the pendulum support 110 in response to a vehicle deceleration condition.

A pair of U-shaped adjusting clips 160 and 162 are retained on the laterally spaced abutment portions 136 and 138 of the transfer link, and respectively underlie and support the lock pawls 120 and 122.

OPERATION

Referring to FIGS. 1 and 4, it will be understood that the pendulum 108 has a normal vertical depending position in which the lock pawls 120 and 122 remain spaced away from the ratchet wheels 50 of the reels 30 and 32. During opening movement of the vehicle door, the belt extends from the retractor as permitted by unwinding rotation of the reel and the passage of the belt around the spindle roller 94. When the door is closed, the winding spring rotates the reel in the belt winding direction to retract the belt and maintain the belt in a taut condition about the seated occupant.

Referring to FIG. 1, it will be understood that a small deceleration of the vehicle or the vehicle travelling up or down a hill will cause the pendulum 108 to tilt inside the gimbal sleeve 116. Such tilting movement of the pendulum 108 does not cause the pendulum head to rise above pendulum support 110 and does not impart any upward movement to the transfer link 130.

When the motor vehicle experiences a severe deceleration condition, the pendulum 108 tilts substantially from the vertical position of FIG. 1 and in so doing upsets the gimbal sleeve 116 from its normal rest position on the pendulum support member 110. Accordingly, the pendulum head 114 is raised substantially above the pendulum support member 110 and exerts an upward lifting force on the central body portion of the transfer link 130.

Referring to FIG. 5, there is shown a mode of retractor operation in which the toothed ratchet plates 50 of reels 30 and 32 are slightly out of phase with one another such that the locking pawl 120 is aligned with the root 58 of one of the teeth 52 of reel 30 while the locking pawl 22 is aligned with the tip 56 of one of the ratchet teeth 52 of the reel 32. Referring to the sectional view of FIG. 3, it will be seen that the transfer link 130 rolls upwardly about the longitudinal axis 140 in the clockwise direction as viewed in FIG. 3 so that the abutment portion 136 and its adjusting clip 160 will pivot the locking pawl 120 upwardly into locking engagement with the root 58 of the reel 30 teeth. The abutment portion 138 and its adjusting clip 162 are blocked from simultaneous upward movement by the blocking engagement of the tooth tip 56 with the pawl 122.

A slight unwinding rotation of the reel 32 from the FIG. 5 position as induced by an occupant restraint load imposed on the belt 102 will rotate the reel 32 slightly in the unwinding direction so that the tip 56 moves out of blocking engagement of the pawl 122. The tilted pendulum 108 is then permitted to impart a counter rolling movement to the transfer link 130 so that the abutment portion 138 and adjusting clip 162 will pivot the lock pawl 122 into engagement with the then aligned tooth root 58 to block any subsequent unwinding rotation of the reel 32.

It will be understood that the trunnion pins 142 and 144 are received within the mounting cradles 146 and 148 in a manner which enables the rolling and subsequent counter rolling motion of the transfer link 130. On the other hand, the axially extending pin 150 is engageable with the upper wall of the opening 154 in the mounting tab 156 to limit the upward motion of the mounting end 132 of the transfer link 130 so that the transfer link 130 will pivot about the mounting end to raise the abutment portions 136 and 138 upwardly for in turn pivoting the lock pawls 120 and 122 to the ratchet engaging positions. If the reels 30 and 32 are rotating in phase with one another the transfer link 130 will pivot upwardly about the mounting pin 150 to simultaneously raise both the abutment portions 136 and 138 and thereby simultaneously pivot both locking pawls 120 and 122 into engagement with their respective reels 30 and 32.

Referring again to FIG. 5, the locking of the reel 30 against unwinding rotation causes the onset of an occupant restraint load on the belt 42. This load is imparted to the spindle assembly 80 and causes the spindle assembly to move upwardly along the elongated aperture 74 in a direction generally toward the reel 30. The meshing engagement of the pinion teeth 84 with the rack teeth 76 causes the spindle assembly 80 to move linearly up the rack teeth 76 while rotating in a counterclockwise direction. This movement of the spindle 80 causes the belt 42 to be progressively rolled up around the fixed bar 88 and the pivoting bar 90. The pivoting bar 90 is forcibly pivoted toward the fixed bar 88 so that the belt 42 is clamped between the bars. Reference may be had to the U.S. Pat. No. 4,300,731 issued Nov. 17, 1981 to Joseph D. Kondziola for a more detailed description of the construction and operation of the belt roll-up and clamping mechanism.

When the vehicle deceleration condition ends, the pendulum 108 returns to the normal vertical position of FIG. 1 and allows the transfer link 130 to pivot downwardly away from the locking pawls 120 and 122. Termination of the occupant restraint load on the belts permit the unrolling of the belt from the spindle assembly and then the rewinding of the belt onto the reels 30 and 32 as permitted by pivoting movement of the lock pawls 120 and 122 to their normal position of FIG. 4 in spaced relation from the ratchet wheels 50 of the reels 30 and 32.

It will be understood that the locking pawls 120 and 122, the ratchet plates 50, and the reels 30 and 32 may be manufactured of plastic since the belt roll-up and clamping mechanisms 62 and 100 effectively withstand the occupant restraint load and relieve the reels 30 and 32 of the load imposed on the occupant restraint belt.

Thus, it is seen that the invention provides a transfer link which is operated by an inertia sensing member and mounted for pivoting and rolling movement to actuate either one or both of locking pawls associated with the dual reels of the retractor.

The embodiments of the invention in which an exclusive property or privilege is claimed are defined as follows:

1. A dual reel seat belt retractor comprising:
   a housing;
   first and second belt reels journaled on the housing for belt winding and unwinding rotation about parallel axes;
   first and second ratchet wheels carried respectively by the first and second reels and having circumferentially spaced ratchet teeth;
   first and second pawls mounted on the housing for movement between ratchet teeth engaging and disengaging positions respectively with the first and second ratchet wheels;
   a transfer link having a longitudinal axis, first and second abutment portions spaced each side of the longitudinal axis of the transfer link and engaging respectively with the first and second pawls, a central portion, and a mounting end having a pair of trunnion pins projecting laterally of the mounting end and an axial pin projecting axially of the mounting end;
   first and second mounting cradles carried by the housing and receiving the trunnion pins to restrain the transfer link against bodily movement along its axis but permit rolling movement of the transfer link about the axis and pivoting movement about the trunnion pins;
   an apertured mounting tab carried by the housing and interfitting with the axial pin of the transfer link to restrain the upward movement of the mounting end in the upward direction toward the reels; and
   an inertia sensor mounted on the housing and engaging the central portion of the transfer link whereby upon occurrence of predetermined inertia stimulus the transfer link is pivoted upwardly about the mounting end to simultaneously engage the first and second pawls with the ratchet teeth when the first and second ratchet wheels are in phase with one another and permitting the transfer link to roll simultaneous with pivoting movement to engage the first pawl with the first ratchet wheel irrespective of tip-on-tip locking engagement of the second pawl by the second ratchet wheel and then permit subsequent counter rolling movement of the transfer link by the inertia sensor to engage the second pawl with the second ratchet plate as permitted by slight unwinding rotation of the second reel to align the second ratchet wheel tooth for locking engagement by the second pawl.

* * * * *